United States Patent [19]

Hohmann et al.

[11] 4,166,822
[45] Sep. 4, 1979

[54] BRANCHED-CHAIN ALKYL AMINO ANTHRAQUINONES

[75] Inventors: Walter Hohmann, Leverkusen; Werner Kühnel, Leverkusen-Steinbüchel, both of Fed. Rep. of Germany

[73] Assignee: Bayer Aktiengesellschaft, Leverkusen, Fed. Rep. of Germany

[21] Appl. No.: 762,508

[22] Filed: Jan. 26, 1977

Related U.S. Application Data

[62] Division of Ser. No. 308,726, Nov. 22, 1972, abandoned.

[30] Foreign Application Priority Data

Nov. 22, 1971 [DE] Fed. Rep. of Germany ....... 2157771

[51] Int. Cl.² .................. C07C 97/24; C07C 97/26
[52] U.S. Cl. ..................................... 260/380; 8/2.5 R
[58] Field of Search ........................................ 260/380

[56] References Cited

U.S. PATENT DOCUMENTS

| 2,204,749 | 6/1940 | Coffey et al. | 260/380 |
| 3,686,232 | 8/1972 | Hohmann et al. | 260/380 |

FOREIGN PATENT DOCUMENTS

| 252951 | 5/1960 | Australia | 260/380 |
| 1445843 | 6/1966 | France | 8/2.5 |
| 490372 | 8/1938 | United Kingdom | 260/380 |
| 1169957 | 11/1969 | United Kingdom | 8/2.5 |

OTHER PUBLICATIONS

CIBA Ltd., "Brominated Amino Anthraquinones", in Chem. Abs. vol. 60, 10623(b).

Tokumitsu et al., "Synthesis of Anthraquinone Derivatives Containing the Cyclohexylamino Group", Chem. Abs., vol. 66, 1967, 38860f.

Primary Examiner—Arthur P. Demers
Attorney, Agent, or Firm—Plumley and Tyner

[57] ABSTRACT

Use of the dyestuffs of the formula

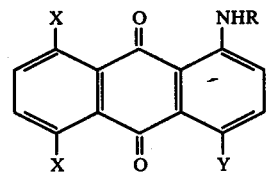

wherein R, Y and X have the meaning given in the description, for the dyeing of synthetic textiles, especially those of aromatic polyesters, by the transfer printing process.

Prints obtained are distinguished by good fastness in use properties.

3 Claims, No Drawings

BRANCHED-CHAIN ALKYL AMINO ANTHRAQUINONES

This is a division of application, Ser. No. 308,726, filed Nov. 22, 1972, now abandoned.

The subject of the invention is a process for dyeing textiles of synthetic fibre materials by transfer printing.

By "transfer printing" there is understood a dyeing process in which the dyestuffs are transferred by sublimation, through the action of heat, from a printed auxiliary carrier onto the textile substrate.

It is therefore in the nature of this method of dyeing that for its successful application it is necessary to provide dyestuffs which can be sublimed relatively easily.

The conventional dispersion dyestuffs, such as are used, say, for dyeing polyester fibre materials from an aqueous liquor, are in most cases unsuitable for this new process because of their fastness to sublimation, which has frequently been raised to high levels.

It has now been found that anthraquinone compounds of the formula

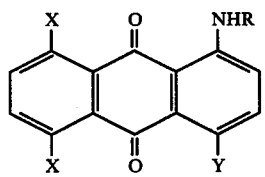

in which
R represents a $C_1$–$C_6$-alkyl or $C_5$–$C_6$-cycloalkyl radical which is optionally substituted by hydroxyl, halogen, nitrile, $C_1$–$C_2$-alkoxy or acetylamino,
Y denotes hydrogen, halogen or a $NHR_1$-group
wherein
$R_1$ represents hydrogen, a $C_1$–$C_6$-alkyl radical which is optionally substituted by hydroxyl, halogen, nitrile, $C_1$–$C_2$-alkoxy or acetylamino, or a $C_5$–$C_6$-cycloalkyl radical and
X represents hydrogen or a hydroxyl or $C_1$–$C_4$-alkoxy group, with the proviso that not both radicals X simultaneously denote hydrogen
are outstandingly suitable for dyeing synthetic textiles by the transfer printing process.

Suitable radicals R and $R_1$ are: methyl, ethyl, n- or iso-propyl, n-, iso- or tert.-butyl, n- or iso-pentyl, n- or iso-hexyl, β-hydroxyethyl, β-methoxyethyl, β-cyanoethyl, 1-hydroxybutyl-(2), β-chloroethyl, β-bromoethyl, β,γ-dichloropropyl, and γ-methoxypropyl radicals, and also the cyclohexyl radical, 2-, 3- or 4-methylcyclohexyl, 3- or 4-methoxy-cyclohexyl, 3- or 4-hydroxy-cyclohexyl, 3- or 4-chloro-cyclohexyl, 3- or 4-bromo-cyclohexyl, 2-, 3- or 4-amino-cyclohexyl, 3- or 4-acetylamino-cyclohexyl, 3- or 4-cyano-cyclohexyl, 2,4-, 2,5- or 2,6-dimethyl-cyclohexyl, 2,4,6-trimethyl-cyclohexyl, 2-methyl-4-isopropyl-cyclohexyl and 3- or 4-isopropyl-cyclohexyl radicals. Amongst these, the isopropyl and cyclohexyl radical are to be regarded as particularly preferred.

Suitable alkoxy radicals X are, for example: methoxy, ethoxy, propoxy, butoxy, β-hydroxy-ethoxy, β-methoxy-ethoxy, β-hydroxy-ethoxy-ethoxy and β-methoxy-ethoxy-ethoxy radicals.

Suitable halogen atoms Y are chlorine atoms, but preferably bromine atoms.

Within the framework of the formula (I), the following types of dyestuff are particularly suitable for transfer printing:
(a) Dyestuffs of the formula

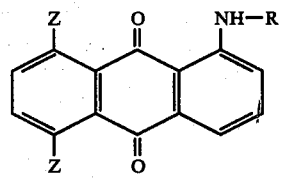

wherein
the radical R has the abovementioned meaning and the radicals Z denote hydrogen or OH, but differ from one another.
(b) Dyestuffs of the formula

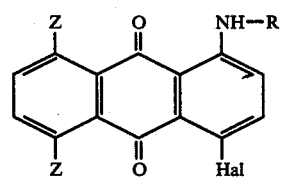

wherein
R and Z have the abovementioned meaning and Hal represents chlorine or bromine.
(c) Dyestuffs of the formula

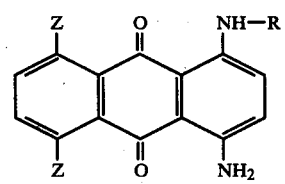

wherein
R and Z have the indicated meaning.
(d) Dyestuffs of the formula

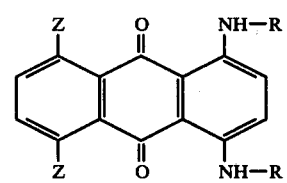

wherein
Z and R have the abovementioned meaning but the two radicals R are different from one another.
(e) Dyestuffs of the formula

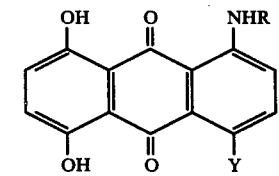

in which
R and Y have the abovementioned meaning.

In the abovementioned formulae, the radical R preferably represents branched alkyl radicals such as isopropyl, isobutyl and isopentyl, as well as a cyclohexyl radical.

The dyestuffs of the formula (I) to be used according to the invention are largely known and are described, for example, in the following patent literature:
(a) British Patent specifications 1,136,932 and 1,136,933,
(b) Belgian Patent specification 752,623 and
(c) French Patent specification 673,484, 1,445,843 and 70/23,755,
(d) German Patent specification 136,777 and
(e) U.S. Pat. No. 1,921,458.

A further subject of the present invention are new anthraquinone compounds of the formula

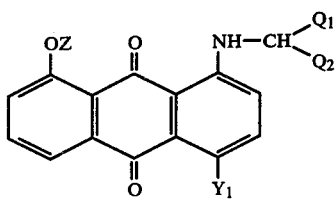

(VII)

in which
$Q_1$ represents straight-chain $C_1$-$C_3$-alkyl,
$Q_2$ denotes $C_1$-$C_2$ alkyl,
$Q_1$ and $Q_2$ together can form an optionally substituted cyclohexyl radical,
$Y_1$ denotes bromine, $NH_2$ or straight-chain $C_1$-$C_6$-alkylamino, and in the case that $Q_1$ represents straight-chain $C_1$-$C_3$-alkyl and $Q_2$ represents $C_1$-$C_2$-alkyl, also denotes hydrogen, chlorine or an optionally substituted cyclohexylamino radical and
Z denotes hydrogen, and in the case that $Q_1$ denotes $C_1$-$C_3$-alkyl and $Q_2$ denotes $C_1$-$C_2$-alkyl, also denotes $C_1$-$C_4$-alkoxy.

Suitable substituents in the abovementioned cyclohexyl radicals are halogen atoms, such as chlorine and bromine, amino groups, $C_1$-$C_4$-alkyl groups and $C_1$-$C_4$-alkoxy groups.

Those compounds of the formula (VII) in which $Y_1$ represents hydrogen are obtained if anthraquinone derivatives of the formula

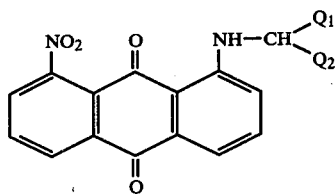

(VIII)

in which
$Q_1$ and $Q_2$ have the abovementioned meaning are reacted, at elevated temperatures, with alcohols of the formula Z'-OH  (IX)

in which
Z' denotes a $C_1$-$C_4$-alkyl radical
in the presence of alkali hydroxides, preferably NaOH and KOH, and the compounds thus obtained, of the formula

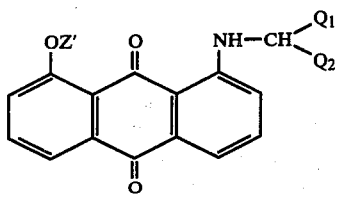

(X)

in which
$Q_1$, $Q_2$ and Z' have the abovementioned meaning are treated, if appropriate, with aqueous mineral acids at elevated temperatures.

The reaction of (VIII) with (IX) preferably takes place in the temperature range of 40°–120° C., preferably 50°–80° C. Preparative details are described in German Patent Application P2157771.9 (Le A 14 009).

The after-treatment of the compounds (X), which may have to be carried out in order to split the ether, is advantageously carried out at 100°–140° C. in aqueous sulphuric acid (about 60–80% strength).

Those compounds of the formula (VII) in which $Y_1$ represents chlorine or bromine are obtained if anthraquinone derivatives of the formula (X) are reacted with halogenating agents such as chlorine or bromine, $SO_2Cl_2$ or $SO_2Br_2$ in an aqueous mineral acid medium or in organic solvents and thereafter, if appropriate, the reaction product of the formula

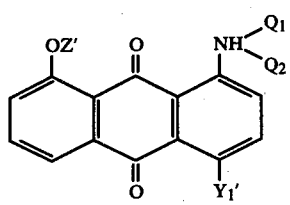

(XI)

in which
$Q_1$, $Q_2$ and Z' have the abovementioned meaning and
$Y_1'$ represents Cl or Br
is treated with aqueous mineral acids.

Examples of possible solvents are nitrobenzene and o-dichlorobenzene, amongst others.

Finally, those compounds of the formula (VII) in which $Y_1$ represents a $NHQ_3$- group are obtained if compounds of the formula (XI) are reacted with amines of the formula $NH_2Q_3$  (XII)

in which
$Q_3$ has the abovementioned meaning
in a manner which is in itself known and the reaction product is optionally thereafter treated with mineral acids.

Suitable amines $NH_2Q_3$ are: ammonia, methylamine, ethylamine, n-propylamine, butylamine, n-hexylamine and cyclohexylamine.

As already explained earlier, the (new and known) anthraquinone dyestuffs of the formula (I) are not employed as such, but indirectly via so-called auxiliary carriers, onto which the dyestuffs are printed as patterns, for transfer printing.

Possible auxiliary carriers for the dyestuffs according to the invention are cellulose fleeces and cellulose textiles, especially paper, but also aluminium foils. In order to obtain mirror-image prints it is also possible to use, as the auxiliary carrier, the same substrate onto which the dyestuff is then to be transferred by sublimation in the second process step, that is to say, for example, a polyester fabric. Further suitable auxiliary carriers are: fleeces or sheets of synthetic polymers, provided that they are sufficiently heat-resistant under the conditions of the subsequent transfer. The transfer is carried out at temperatures of 180°–220° C. for 15–60″.

Suitable substrates which in transfer printing take up the dyestuff which sublimes are, in particular, textiles of synthetic fibres, but non-textile articles can also be printed or dyed according to this process if they have been manufactured from appropriate polymers.

Amongst textiles, woven fabrics, knitted fabrics, fleeces or yarns of synthetic materials, that is to say polymers or copolymers based on polyester, acrylonitrile, polyamide, polyvinyl chloride and polyurethane plastics, are particularly suitable. However, regenerated fibres, such as cellulose triacetate or 2,5-acetate are also suitable. Mixtures of the various fibres with one another can also be used. Natural fibres, such as cotton and wool, are less suitable. However, textile and non-textile structures of natural fibres can also be printed by application of a suitable preparation—in general a preparation of one of the abovementioned polymers.

The dyestuffs to be used according to the invention can be applied to the auxiliary carriers in accordance with the most diverse processes.

(a) By impregnation on padders or by means of slop-pad rollers or spray guns.

(b) In order to obtain colourations in patterns, the customary roller, gravure, rotary screen, flat-bed screen, embossed and flexographic printing machines can be used.

(c) Special effects can be applied to the auxiliary carrier by means of a brush, or patterns can be produced with paper stencils and a spray gun.

(d) The auxiliary carrier can be, for example, a net fabric which is impregnated with the dyestuff which can be sublimed. In this way, a positive net pattern can be produced.

(e) If a net of synthetic fibres is placed between the transfer paper and the substrate, it is possible
1. to colour the net and
2. to colour the textile with a negative net pattern.

(f) If a fabric of synthetic fibres is used as the auxiliary carrier and, after printing, is brought together with a 2nd, unprinted, fabric web of the same material or of another receptive material, and the system is heated to the transfer temperature, the pattern is depicted mirror-image on both materials.

(g) Patterns can be produced by impregnating an auxiliary carrier, for example paper, and subsequently cutting it into patterns and transferring the dyestuff by sublimation from these cut pieces of paper. Random patterns are produced.

(h) If a textile sprinkled in this way with cut pieces of paper—which can be impregnated with dyestuff, is additionally covered with a paper web which is impregnated overall (or in accordance with a pattern) with dyestuff, and the system is then heated to the transfer temperature, typical "reserve effects" are obtained.

If the dyestuffs are to be applied by means of printing pastes, printing inks, spraying solutions or dyeing liquors, the dyestuffs must be present in as finely divided a form as possible and, where possible, as true solutions. If aqueous media are to be used, the dyestuffs will be compounded in the customary manner for textile dispersion dyestuffs. In paper printing, it is preferred to work from organic solvents, such as, for example, alcohols, esters, toluenes and chlorinated hydrocarbons. The dyestuffs must then be incorporated in a suitable form into these solvents.

If printing is to be carried out, the solutions must contain suitable thickeners in order to give the solutions an increased viscosity. These thickeners also fulfil a second function, namely sufficiently to bind the dyestuff to the auxiliary carrier after printing and drying, and to protect it against mechanical abrasion.

In aqueous media, examples of thickeners used are carob bean flour derivatives, alginates, guaranates and others.

In alcoholic pastes, esterified and etherified cellulose derivatives have proved successful.

The auxiliary carriers prepared in this way are brought into intimate contact with the materials to be printed on presses or continuously operating calenders and are heated for 15–60 seconds or longer to the temperatures at which the dyestuff sublimes sufficiently. The temperatures are between 150° and 250° C. and only in exceptional cases will these limits not be observed.

Heat transfer can be effected by direct contact with heating plates, by hot air, hot steam or infra-red radiation. Dyeings and prints which show good fastness in use are obtained on the materials used as substrates.

EXAMPLE 1

(A) 75 g of the dyestuff of the formula

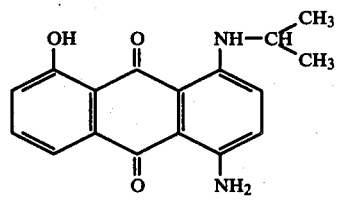

50 g of an anionic dispersing agent, for example a ligninsulphonate or a condensation product based on naphthalenesulphonic acid and formaldehyde, and 100 ml of water are mixed and converted into a finely divided form by grinding for 10 hours in a ball mill.

The dispersion thus obtained, which contains approx. 30% of crude dyestuff, is stable on storage.

(B) The aqueous dispersion obtained according to (A) can be converted into a printing paste as follows: 50–200 g are worked into a paste with 400 g of a 10% strength carob bean flour-ether thickener and 550–400 ml of water.

(C) A paper is printed with this printing paste by gravure printing. If this paper is pressed together with a polyester fibre textile for 15–60 seconds at 200°, a clear, strongly coloured, somewhat reddish-tinged blue print having good to very good fastness properties is obtained.

EXAMPLE 2

(A) A dyestuff dispersion is prepared as described in Example 1A, but the dyestuff

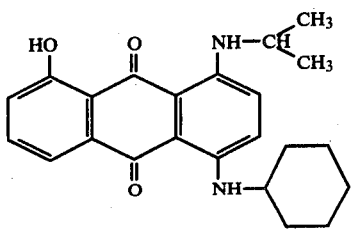

is employed.

(B) 50-200 g of the aqueous dispersion obtained according to (A) are incorporated into a mixture of 450-300 g of a solvent mixture consisting of 1:1, alcohol and ethylene glycol, and 100 ml of water. 400 g of a binder which consists of a 50% strength solution of an ammonium salt of a polyacrylate in 33% strength aqueous ethyl alcohol are added thereto.

The polyacrylate is a copolymer of 60 g of acrylic acid ethyl ester, 25 g of methacrylic acid ethyl ester and 15 g of acrylic acid. (C) A paper is impregnated by means of a spray gun with the printing paste manufactured according to (B). The dyestuff is transferred from this paper, as described in Example 1(C), onto a polyamide textile. A single-sided dyeing in an outstandingly clear blue shade is obtained.

(D) The procedure indicated in (B)+(C) is followed but the ethyl alcohol of the binder is replaced by an equal amount of isopropanol.

EXAMPLE 3

(A) 100 g of a dyestuff dispersion manufactured in accordance with the instruction of Example 1(A), but using the dyestuff

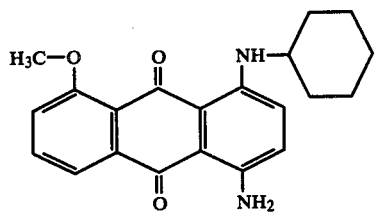

are intimately mixed with 800 g of water and 100 g of a 5% strength alginate thickener.

A cotton fabric web is impregnated with this dyestuff solution on a padder and is subsequently dried.

(B) The cotton fabric obtained according to (A) is suitable for transfer printing, especially onto bulky materials such as, for example, carpets of polyester or polyamide fibres.

EXAMPLE 4

(A) 40-50 g of the dyestuff of the formula

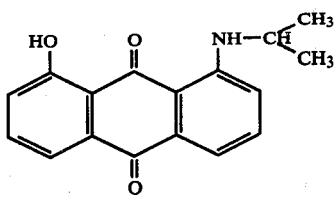

are worked into a paste with 5-10 g of an emulsifier mixture of ethoxylated nonylphenol (4-12 mols of ethylene oxide) in water. 10 g of ethylcellulose N4 (Hercules Powder) and 30-40 parts of a maleate resin which was manufactured by condensation of colophony with maleic acid, are added. The mixture is kneaded for approx. 2 hours at 80°-100° and is subsequently ground on one of the customary mills. A fine-grained dyestuff powder is obtained.

(B) 200 g of the dyestuff powder obtained according to (A) are added, whilst stirring, to a mixture of 730 g of ethanol, 50 g of ethylene glycol and 20 g of ethylcellulose N 22 (Hercules Powder).

(C) Papers can be printed by gravure printing with the printing ink thus obtained. Using these printed papers, textiles of cellulose triacetate, for example knitted fabrics, can be printed by the transfer process, and strong red prints are obtained.

If instead of the dyestuffs employed in Examples 1-4 those of the general formula VII

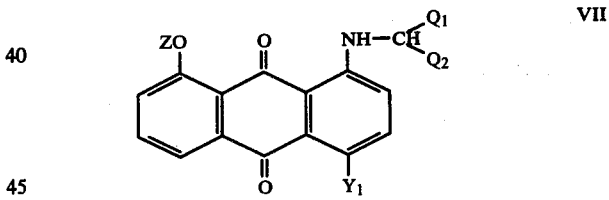

are used, transfer materials or transfer prints having the colour shades indicated in the last column are obtained in accordance with one of the abovementioned processes.

Table I

| $-CH\begin{smallmatrix}Q_1\\Q_2\end{smallmatrix}$ | OZ | $Y_1$ | Colour shade |
|---|---|---|---|
| $-CH\begin{smallmatrix}CH_3\\CH_2-CH_3\end{smallmatrix}$ | OH | H | Red |
| $-CH\begin{smallmatrix}CH_2-CH_3\\CH_2-CH_3\end{smallmatrix}$ | OH | H | " |
| $-\bigcirc$ (cyclohexyl) | OH | H | " |

Table I-continued

| -CH(Q₁)(Q₂) | OZ | Y₁ | Colour shade |
|---|---|---|---|
| 2-methylcyclohexyl | OH | H | " |
| 2,4-dimethylcyclohexyl | OH | H | " |
| 4-hydroxycyclohexyl | OH | H | " |
| 4-aminocyclohexyl | OH | H | " |
| 2-chlorocyclohexyl | OH | H | " |
| 2-methoxycyclohexyl | OH | H | " |
| 4-bromocyclohexyl | OH | H | " |
| 2-isopropylcyclohexyl | OH | H | " |
| -CH(CH₂OH)(CH₂-CH₃) | OH | H | " |
| -CH(CH₃)(CH₃) | OH | Cl | " |
| " | OH | Br | " |
| -CH(CH₃)(CH₂-CH₃) | OH | Br | " |
| -CH(CH₃)(CH₂-CH₂-OCH₃) | OH | Cl | " |
| -CH(CH₃)(CH₃) | OCH₃ | Br | " |
| " | OCH₃ | Cl | " |
| " | OC₂H₄OCH₃ | Br | " |
| " | OC₂H₅ | Br | " |
| cyclohexyl | OH | Br | " |
| 2-methylcyclohexyl | OH | Br | " |
| -CH(CH₂-CH₃)(CH₃) | OH | NH₂ | Reddish-tinged blue |
| -CH(CH₂-CH₃)(CH₂-CH₃) | OH | NH₂ | Reddish-tinged blue |

Table I-continued

| −CH(Q₁)(Q₂) | OZ | Y₁ | Colour shade |
|---|---|---|---|
| −C₆H₁₁ (cyclohexyl) | OH | NH₂ | Reddish-tinged blue |
| −C₆H₁₀−CH₃ | OH | NH₂ | Reddish-tinged blue |
| −C₆H₁₀−OH | OH | NH₂ | Reddish-tinged blue |
| −CH(CH₃)₂ | OH | NH—CH₃ | Blue |
| " | OH | NH—CH₂—CH₂OH | " |
| " | OH | NH—CH₂—CH—CH₃ with CH₃ | " |
| " | OH | NH—CH₂—CH₂—CN | " |
| " | OH | NH—C₆H₅ | " |
| −CH(CH₃)(CH₂—CH₃) | OH | NH—C₆H₄—CH₃ | " |
| −C₆H₁₁ | OH | —NH—CH₃ | " |
| −C₆H₁₁ | OH · | —NH—CH₂—CH₂OH | " |
| −C₆H₁₁ | OH | —NH—CH₂—CH₂—CH₃ | " |
| −CH(CH₃)₂ | OCH₃ | —NH₂ | Violet |
| " | O—CH₂—CH₂—OCH₃ | —NH₂ | " |
| " | OCH₃ | —NH—CH₃ | Reddish-tinged blue |
| −CH(CH₃)(CH₂—CH₃) | OC₂H₅ | —NH—CH₂—CH₂—OH | Reddish-tinged blue |
| −CH(CH₃)₂ | OCH₃ | NH—C₆H₅ | Reddish-tinged blue |
| −C₆H₁₁ | OCH₃ | NH₂ | Violet |

The manufacture of the individual dyestuffs described above will be explained in more detail with the aid of the following characteristic synthesis examples:

EXAMPLE 5

(A) Preparation of 1-isopropylamino-8-(β-methoxy-ethoxy)anthraquinone.

15 g of 1-isopropylamino-8-nitro-anthraquinone are stirred into a solution of 60 ml of ethylene glycol monomethyl ether and 15 g of potassium hydroxide at 55° and the mixture is further stirred at 60°–65° (approx. 1 hour being required) until only a trace of the starting material remains chromatographically detectable. The mixture is diluted with 120 ml of water and the product is filtered off, washed with water until neutral and dried in vacuo at 60°. Yield: 16.7 g.

(B) Preparation of 1-isopropylamino-4-bromo-8-methoxy-anthraquinone 50 g of 1-isopropylamino-8-methoxy-anthraquinone are dissolved in 500 ml of 30% strength hydrochloric acid; 33 g of bromine are added dropwise to the clear solution over the course of 15 minutes at 10°–15° and the mixture is stirred for a further 18 hours at room temperature. It is stirred into 5,000 ml of ice-cold water, excess bromine is removed by means of the amount of bisulphite just required, and the product is filtered off, washed until neutral and dried in vacuo. Yield: 62 g. Bromine content: 21.1%.

(C) Preparation of 1-isopropylamino-8-hydroxy-anthraquinone 25 g of 1-isopropylamino-8-(β-methoxy-ethoxy)-anthraquinone are dissolved in 75 ml of 75% strength sulphuric acid and the solution is stirred at 130°–135° until no further starting material is detectable in a worked-up sample (approx. 90 minutes being required). The mixture is stirred until it has cooled to 80° and is diluted with 85 ml of water at the same temperature, it is left until the product precipitates as crystals and diluted with a further 41 ml of water at above 50°, the product is filtered off at 50° and rinsed with 35% strength sulphuric acid, the filter residue is decomposed in water and the product is filtered off, washed until neutral and dried in vacuo. Yield: 15.5 g. Quality: 98% pure.

(D) Preparation of 1-isopropylamino-4-bromo-8-hydroxy-anthraquinone 55 g of 1-isopropylamino-8-hydroxy-anthraquinone are dissolved in 110 ml of nitrobenzene at 100°, the solution is cooled to 15°–20° whilst stirring, 40 g of bromine are added over the course of approx. 10 minutes, the mixture is stirred overnight until cold and is diluted with 150 ml of methanol whilst cold, the whole is stirred for some time longer and the product is filtered off, washed with methanol and dried. Yield: 53 g.

(E) Preparation of 1-isopropylamino-4-cyclohexylamino-8-hydroxy-anthraquinone 18 g of 1-isopropylamino-4-bromo-8-hydroxy-anthraquinone, 36 ml of cyclohexylamine, 6.5 of potassium acetate and catalytic amounts of copper$^I$ chloride are stirred at 80°–90° until only a little starting material is still detectable. The mixture is now diluted with 36 ml of methanol and the reaction product which has separated out is filtered off at 60°, washed with boiling hot methanol, finally stirring with dilute hydrochloric acid, filtered off, washed until neutral and dried.

(F) Preparation of 1-isopropylamino-4-amino-8-hydroxy-anthraquinone 72 g of 1-isopropylamino-4-bromo-8-hydroxy-anthraquinone, 28 g of potassium acetate, 290 g of p-toluenesulphamide and 1.4 g of basic copper sulphate are warmed for 25 minutes at 150°–155°, whilst stirring. When the temperature has dropped to 130°, the mixture is rapidly diluted with 500 ml of methanol and the precipitate is filtered off at 60° and washed with hot methanol and water. 80.3 g of 1-isopropylamino-4-p-toluenesulphonamido-8-hydroxy-anthraquinone are obtained. 30 g of the product thus obtained, in 150 ml of 78% strength sulphuric acid, are warmed to 60°–70° until no further starting material is detectable. The mixture is slowly diluted, below 50°, with sufficient water to give a 35% strength sulphuric acid and the product is filtered off and washed with 30% strength sulphuric acid. The filter residue is stirred into water, filtered off, washed until neutral and dried. Yield: 19.3 g.

EXAMPLE 6

(A) 10 g of the dyestuff of the formula

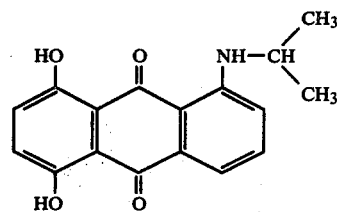

are ground with 10 g of ethylcellulose N4 (Hercules Powder) and 80 g of a 2:1 mixture of ethanol and ethylene glycol for 8 hours in a ball mill.

(B) A paper suitable for transfer is printed by flexographic printing with the printing ink obtained according to (A).

A fabric of polyacrylonitrile is pressed together with this paper at 190° for 30 seconds. The pattern becomes depicted on the acrylic fabric as a clear, strongly reddish-tinged violet print.

Similar effects are achieved if instead of the above-mentioned dyestuff, the corresponding 4-chloro (or 4-bromo) derivative or 1-isopropylamino-4-cyclohexylamino-5,8-dihydroxyanthraquinone are used.

The manufacture of these dyestuffs is explained in more detail in the example which follows:

EXAMPLE 7

(A) Preparation of 1-isopropylamino-5,8-dihydroxy-anthraquinone 250 g of 82% strength 5-nitro-quinizarine in 800 ml of nitrobenzene are treated at 110°–115°, under reflux, with 185 ml of a 70% strength aqueous isopropylamine solution over the course of approx. 90 minutes, whereupon the temperature drops to about 105°. 1,600 ml of ethanol are added dropwise at 70°–80° and the mixture is stirred until cold and for a further 15 hours whilst cold. The product is filtered off and the filter cake is washed with ethanol and water and dried.
Yield: 171 g.

(B) Preparation of 1-isopropylamino-4-chloro-5,8-dihydroxyanthraquinone.

50 g of 1,4-dichloro-5,8-dihydroxy-anthraquinone are dissolved in 250 ml of nitrobenzene and a total of 80 ml of a 70% strength aqueous isopropylamine solution is added over the course of 11 hours at 180°–190°. The water which evaporates is condensed in a descending condenser. The mixture is stirred until cold and then for a prolonged period whilst cold and the precipitate is filtered off, washed with methanol and dried. Yield: 43.1 g.

The corresponding 4-bromo compound can be manufactured analogously.

It can also be obtained analogously to the instruction given in Example 5(D) starting from 1-isopropylamino-5,8-dihydroxy-anthraquinone.

The reactions of this 4-chloro (or 4-bromo) compound with cyclohexylamine to give 1-isopropylamino-4-cyclohexylamino-5,8-dihydroxy-anthraquinone take place in the manner described in Example 5(E).

EXAMPLE 8

(A) 75 g of the dyestuff of the formula

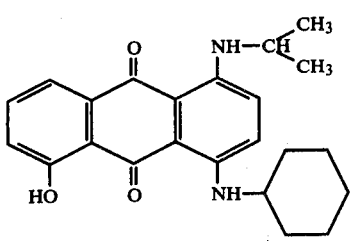

50 g of an anionic dispersing agent, for example a legninsulphonate or of a condensation product of naphthalenesulphonic acid and formaldehyde, and 100 ml of water are mixed and converted into a finely divided form by grinding for 10 hours in a ball mill.

The dispersion thus obtained, which contains approx. 30% of crude dyestuff, is stable on storage.

(B) The aqueous dispersion obtained according to (A) can be converted into a printing paste as follows: 50–200 g are worked into a paste with 400 g of a 10% strength carob bean flour ether thickener and 550–400 ml of water.

(C) A paper is printed with this printing paste by the gravure printing process. If this paper is pressed together with a textile of polyester fibres for 15–60 seconds at 200°, a clear, reddish-tinged blue print having good to very good fastness properties is obtained.

EXAMPLE 9

(A) A dyestuff dispersion is prepared as described in Example 8A, but the dyestuff

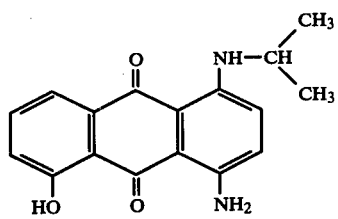

is employed.

(B) 50–200 g of the aqueous dispersion obtained according to (A) are worked into a mixture of 450–300 g of a solvent mixture consisting of 1:1, alcohol and ethylene glycol, and 100 ml of water. 400 g of a binder which consists of a 50% strength solution of an ammonium salt of a polyacrylate in 33% strength aqueous ethyl alcohol, are added thereto. The polyacrylate is a copolymer of 60 g of acrylic acid ethyl ester, 25 g of methacrylic acid ethyl ester and 15 g of acrylic acid.

(C) A paper is impregnated with the printing paste manufactured according to (B), using a spray gun. The dyestuff is transferred from this paper onto a polyamide textile, in the manner described in Example 6(C). A single-sided dyeing in a very clear blue shade is obtained.

EXAMPLE 10

(A) 40–50 g of the dyestuff of the formula

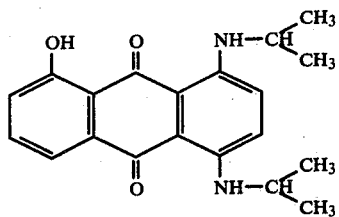

are worked into a paste with 5–10 g of an emulsifier mixture of ethoxylated nonylphenol (4–12 mols of ethylene oxide) in water. 10 g of ethylcellulose N4 (Hercules Powder) and 30–40 parts of a maleate resin which was manufactured by condensation of colophony with maleic acid, are added. The mixture is kneaded for approx. 2 hours at 80°–100° and is subsequently ground on one of the customary mills. A fine-grained dyestuff powder is obtained.

(B) 175 g of the dyestuff powder obtained according to (A) are added, whilst stirring, to a mixture of 750 g of ethanol, 55 g of ethylene glycol and 20 g of ethylcellulose N22 (Hercules Powder).

(C) Papers can be printed by gravure printing with the printing ink thus obtained, and textiles of cellulose triacetate, for example knitted fabrics, can be printed with these papers by the transfer printing process. Strong, reddish-tinged blue prints are obtained.

EXAMPLE 11

(A) 100 g of a dyestuff dispersion manufactured according to the instruction of Example 8(A), but using the dyestuff

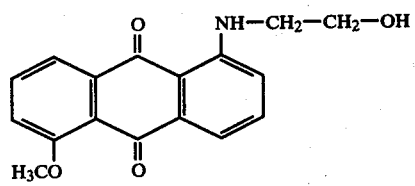

are intimately mixed with 800 g of water and 100 g of a 5% strength alginate thickener.

A cotton fabric web is impregnated with this dyestuff solution on a padder and subsequently dried.

(B) The cotton fabric obtained according to (A) is suitable for transfer printing but very particularly for printing on bulky materials. Clear scarlet shades are obtained on polyester and polyamide fibres.

If instead of the dyestuffs employed in Examples 6 and 8–11, those of the general formula

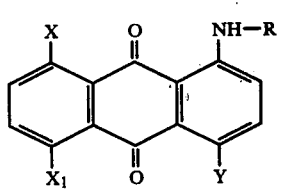

are used, transfer materials, or textile materials printed by the transfer process, having the colour shades indicated in the last column of Table II, are obtained according to one of the processes mentioned in Examples 6 and 8–11. The dyestuffs can be obtained analogously to one of the processes described in Examples 5 and 7.

Table IIA

| R | X | X₁ | Y | Colour shade |
|---|---|----|---|--------------|
| —CH₃ | OH | H | H | Red |
| —CH₂—CH₃ | OH | H | H | " |
| —CH₂—CH₂—CH₃ | OH | H | H | " |
| —CH₂—CH₂—OH | OH | H | H | " |
| —CH₂—CH₂—CH₃ | H | OH | H | " |
| —CH₂—CH₂—OH | H | OH | H | " |
| cyclohexyl-CH₃ | H | OH | H | " |
| cyclohexyl-OH | H | OH | H | " |
| —CH₃ | OH | OH | H | Reddish-tinged violet |
| —CH₂—CH₂—OH | OH | OH | H | Reddish-tinged violet |
| —CH(CH₃)₂ | OH | OH | H | Reddish-tinged violet |
| cyclohexyl | OH | OH | H | Violet |
| cyclohexyl-NH₂ | OH | OH | H | " |
| —CH₃ | OH | OH | Br | " |
| —CH(CH₃)₂ | OH | OH | Br | " |
| cyclohexyl | OH | OH | Br | Strongly reddish-tinged blue |
| —CH₃ | H | OH | —NH—CH₂—CH₂—Br | Violet |
| —CH₃ | OCH₃ | H | NH₂ | Claret |
| —CH₃ | OH | H | NH₂ | Reddish-tinged violet |
| —CH₃ | H | OH | —NH—CH₂—CH(CH₃) | Bluish-tinged violet |
| —CH₂—CH₂—CN | H | OH | —NH—CH₃ | " |
| —CH₂—CH₂—OH | OH | H | —NH₂ | Reddish-tinged violet |
| —CH₃ | H | OH | Br | Red |
| —CH₂—CH₂—CH₃ | OH | H | Br | " |
| —CH₂—CH₃ | OH | OCH₃ | Cl | Claret |
| —CH(CH₃)₂ | OH | OCH₃ | H | " |
| —CH(CH₃)₂ | OCH₃ | OCH₃ | H | Red |

Table IIB

| R | X | X₁ | Y | Colour shade |
|---|---|----|---|--------------|
| —CH(CH₃)₂ | H | OH | H | Red |
| —CH(CH₃)(CH₂—CH₃) | H | OH | H | " |

Table IIB-continued

| R | X | X₁ | Y | Colour shade |
|---|---|----|---|--------------|
| —CH(CH₃)₂ | H | OCH₃ | H | Scarlet |
| " | H | OC₂H₅ | H | " |
| " | H | O—CH₂—CH₂OH | H | " |
| " | H | OH | Br | Red |
| " | H | OCH₃ | Br | Yellowish-tinged red |
| —C₆H₁₁ (cyclohexyl) | H | OH | Cl | Yellowish-tinged red |
| —CH(CH₃)₂ | H | OH | NH₂ | Reddish-tinged blue |
| —CH(CH₃)(CH₂—CH₃) | H | OH | NH₂ | Reddish-tinged blue |
| —CH(CH₃)₂ | H | OH | NH—CH₃ | Blue |
| —CH(CH₃)₂ | H | OH | —NH—CH₂—CH₂OH | " |
| " | H | OH | —NH—CH₂—CH(CH₃)₂ | " |
| —CH(CH₃)(CH₂—CH₃) | H | OH | —NH—CH₂—CH₂—Br | " |
| —CH(CH₃)₂ | H | OH | NH—C₆H₁₁ | " |
| CH₃ | H | OH | H | Red |
| —C₆H₁₁ | H | OH | H | " |
| CH₃ | OCH₃ | H | H | Scarlet |
| CH₃ | H | OCH₃ | H | " |
| CH₂—CH₂—OH | OC₂H₅ | H | H | " |
| —C₆H₁₁ | H | OCH₃ | H | " |
| CH₃ | OH | OH | Cl | Violet |
| CH₂—CH₃ | OH | OH | Cl | " |
| CH₂—CH₂—OH | OH | OH | Cl | " |
| —CH(CH₃)₂ | OH | OH | Br | " |
| —C₆H₁₁ | OH | OH | Cl | " |
| CH₃ | OH | OH | NH₂ | Greenish-tinged blue |
| —CH₂—CH₂OH | OH | OH | NH₂ | Greenish-tinged blue |
| CH₃ | OH | OH | NH—CH₂—CH₂—CH₃ | Blue-green |
| —CH(CH₃)₂ | OH | OH | NH—CH₃ | " |
| —C₆H₁₁ | OH | OH | NH—CH₃ | " |
| —C₆H₁₁ | OH | OH | NH—CH(CH₃)₂ | " |

Table IIB-continued

| R | X | X₁ | Y | Colour shade |
|---|---|---|---|---|
| —CH₂—CH₂OH | OH | OH | NH—CH₃ | " |
| CH₃ | OH | OH | NH—CH₃ | " |
| CH₃ | OH | H | NH—CH₃ | Blue |
| CH₂—CH₂—OH | H | OH | —NH—CH₂—CH₂—OH | " |
| —cyclohexyl | OH | H | —cyclohexyl | Greenish-tinged blue |
| —CH(CH₃)(CH₂—CH₃) | H | OH | —CH(CH₃)(CH₂—CH₃) | Blue |

We claim:

1. Anthraquinone compound of the formula:

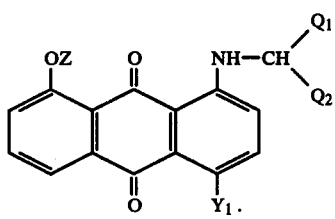

wherein $Q_1$ is methyl;
$Q_2$ is methyl or ethyl;
$Y_1$ is bromo, isopropylamino, sec-butylamino, cyclohexylamino, or methylcyclohexylamino; and
Z is hydrogen or methyl.

2. Compound according to claim 1, wherein
$Q_1$ and $Q_2 = CH_3$
$Y_1 = $ cyclohexylamino
$Z = H$ 3. Anthraquinone compound of claim 1 wherein
$Q_2 = CH_3$;
$Y_1 = $ sec-butylamino; and
$Z = H$.

* * * * *